(12) United States Patent
Stoddart et al.

(10) Patent No.: US 11,569,539 B1
(45) Date of Patent: Jan. 31, 2023

(54) IMPACT SCREEN

(71) Applicant: Zoox, Inc., Foster City, CA (US)

(72) Inventors: Thomas Andrew Stoddart, Mountain View, CA (US); Ramanjaneya Reddy Butukuri, Union City, CA (US); Austin Hilton, Foster City, CA (US); Kevin Francis O'Hara, Santa Clara, CA (US); Andrew John Piper, Palo Alto, CA (US)

(73) Assignee: Zoox, Inc., Foster, CA (US)

( * ) Notice: Subject to any disclaimer, the term of this patent is extended or adjusted under 35 U.S.C. 154(b) by 374 days.

(21) Appl. No.: 16/726,522

(22) Filed: Dec. 24, 2019

(51) Int. Cl.
*B60K 1/04* (2019.01)
*H01M 50/20* (2021.01)

(52) U.S. Cl.
CPC .............. *H01M 50/20* (2021.01); *B60K 1/04* (2013.01); *B60Y 2306/01* (2013.01)

(58) Field of Classification Search
CPC .... B62D 21/15; B62D 21/152; B62D 21/155; B60Y 2306/01
See application file for complete search history.

(56) References Cited

U.S. PATENT DOCUMENTS

| | | | | |
|---|---|---|---|---|
| 4,836,312 | A * | 6/1989 | Hubbard | G01G 3/16 |
| | | | | 177/154 |
| 6,386,611 | B1 * | 5/2002 | Buchfink | B60R 11/02 |
| | | | | 296/187.08 |
| 11,027,782 | B2 * | 6/2021 | Fujii | B62D 25/08 |
| 11,167,798 | B1 * | 11/2021 | Butukuri | B62D 21/15 |
| 2013/0249243 | A1 * | 9/2013 | Lee | B62D 25/082 |
| | | | | 296/187.11 |
| 2015/0121767 | A1 * | 5/2015 | Nagamori | H05K 5/03 |
| | | | | 49/463 |
| 2015/0273996 | A1 * | 10/2015 | Onodera | H01M 50/20 |
| | | | | 429/100 |
| 2018/0162447 | A1 * | 6/2018 | Fees | B62D 21/07 |
| 2019/0210652 | A1 * | 7/2019 | Sawatzki | B60T 7/065 |
| 2020/0017149 | A1 * | 1/2020 | Ryu | B62D 21/11 |

FOREIGN PATENT DOCUMENTS

WO   WO-2019001528 A1 *  1/2019  ............. B62D 21/09
WO   WO-2019001531 A1 *  1/2019  ............... B60K 1/04

* cited by examiner

*Primary Examiner* — James A English
(74) *Attorney, Agent, or Firm* — Lee & Hayes, P.C.

(57) ABSTRACT

A vehicle system may include an impact screen for reducing damage in a collision involving the vehicle. The impact screen may be disposed in a cavity of the vehicle system between a motor unit and a battery to reduce a likelihood of impact and/or a force of an impact between the motor unit and the battery. The impact screen may be fixed at opposite sides of the vehicle, such that motor unit moves relative to the impact screen during the collision.

18 Claims, 4 Drawing Sheets

IMPACT SCREEN

BACKGROUND

During a vehicle collision, maintaining the integrity of certain vehicle components may be of particular importance. For instance, electric and hybrid vehicles can include batteries that, if impacted during a crash event, can result in extensive loss. However, as vehicles become smaller and/or lighter to increase vehicle efficiency, during a crash event the likelihood of impact to vehicle components, like the battery, increases.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

During a vehicle collision, injuries to occupant(s) of the vehicle and/or damage to people and/or objects proximate the vehicle may result from vehicle components colliding with each other and/or when such components breach an occupied cabin of the vehicle. Conventional designs may attempt to reduce harm from collisions by spacing heavier and/or more critical components farther from each other, e.g., to reduce the likelihood that such components will come into contact. For instance, some conventional vehicle arrangements may place a battery or fuel cell proximate a first end of the vehicle and other, relatively massive components, such as a motor, proximate a second, opposite end. In these designs, the spacing of the components reduces the likelihood that the motor impacts the battery, for example. However, these conventional designs often require a relatively large footprint to provide adequate spacing. Moreover, such designs limit overall vehicle design.

In some examples of this disclosure, a vehicle body can define a cavity proximate an end of the vehicle, and a number of components may be disposed in the cavity. For instance, the cavity can house drive components, such as a motor unit to drive wheels of the vehicle. The cavity can also house power components, such as a battery. The battery may be a source of substantially all power for the vehicle, including for the motor unit. In examples, the cavity may be relatively compact, such that the motor unit and the battery are in relatively close proximity.

During a collision event, the cavity may crush or otherwise reduce in volume, causing the motor unit and the battery to move relatively closer to each other. Because of their relative masses, the motor unit and the battery may be two of the most destructive components in the cavity in the event of the collision. For instance, the motor unit may contact the battery, causing damage to the battery. Also in some examples, the motor unit and/or the battery may breach a passenger compartment, potentially harming passengers in the vehicle.

Examples of this disclosure are generally directed to impact structures configured to increase safety outcomes during a collision, such as those just discussed. In some examples, the impact structures can include a screen configured to extend laterally across a vehicle cavity to redirect or interfere with travel of vehicle components during a vehicle collision. For instance, the screen may be configured to extend laterally across the cavity discussed above, between the motor unit and the battery. In this example arrangement, the impact screen may reduce the likelihood of the motor unit contacting the battery during the collision and/or to reduce an impact force of the motor unit with the battery.

According to some examples, the impact screen can be configured for securement proximate lateral sides of the vehicle. For instance, the impact screen can be secured to frame elements on opposite sides. Also in examples, the battery and/or the motor unit may be mounted to one or more different frame elements. For instance, a portion of the first frame element(s) to which the impact screen is attached may remain relatively rigid during an impact, whereas the second frame element(s) to which the motor unit and/or the battery is/are attached may be configured to move during the impact. In this example, the battery and/or the motor unit may move relative to the impact screen during an impact, such as the impact described above. During the impact, the motor unit may contact the impact screen, with the impact screen reducing the momentum of the motor unit.

In some examples, the impact screen can be a relatively thin structure, e.g., with a minimal thickness in a direction between the motor unit and the battery. For instance, the impact screen can be formed of sheet metal or other lower profile materials. In at least some examples, the impact screen can be formed as a mesh or net, e.g., from wire rope, cable, and/or similar materials. The impact screen may also include multiple materials. For instance, in some implementations the impact screen can include a core material and a coating. The core material may be a metal or metal-composite, and the coating may be a polymer coating in some examples.

The techniques and systems described herein may be implemented in a number of ways. Example implementations are provided below with reference to the following figures.

Figure 1:
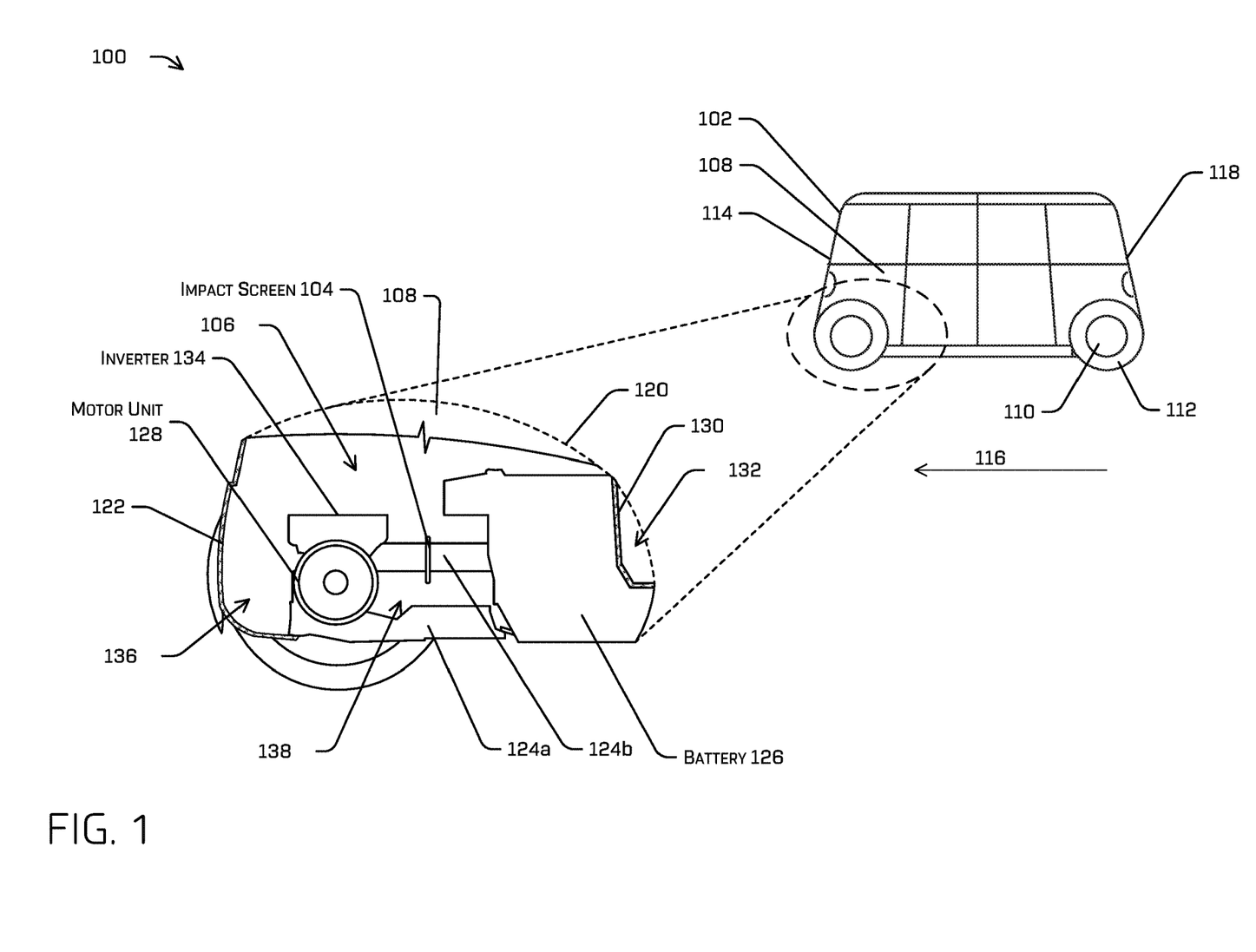
FIG. 1 is a side view of aspects of an example vehicle including an impact screen, according to aspects of this disclosure.

FIG. 1 illustrates an example environment 100 in which a vehicle 102 with improved impact structures is operating. The impact structures can include an impact screen 104 disposed in a vehicle cavity 106 to increase safety outcomes during a collision, as detailed herein.

In various examples, the vehicle 102 can include a body 108 defining an exterior portion of the vehicle 102 and/or defining an occupant portion in which an occupant may travel. In some examples, the body 108 of the vehicle 102 may include one or more frame elements coupled to the exterior portion and/or the occupant portion. In other examples, the body of the vehicle 102 may not include a frame.

For the purpose of illustration, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to stop, including all parking functions, it may be unoccupied and may omit conventional manual vehicle controls, such as a steering wheel, acceleration and/or braking controls, or the like. This is merely an example, and the systems and methods described herein may be incorporated into any ground-borne vehicle, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The example vehicle 102 shown in FIG. 1 is an automobile having four wheels 110 and respective tires 112 for each of the wheels 110. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels 110, the systems and methods described herein may be incorporated into vehicles having fewer or a greater number of wheels, tires, and/or tracks. The example vehicle 102 has four-wheel steering and may operate generally with equal performance characteristics in all directions. The vehicle 102 may be bidirectional, e.g., such that a first end 114 of the vehicle 102 is the front end of the vehicle when travelling in a first direction (represented by the arrow 116), and the first end 114 becomes the rear end of the vehicle 102 when traveling in a second direction opposite the direction of the arrow 116. Similarly, a second end 118 of the vehicle 102 is the rear end of the vehicle 102 when travelling in the first direction and the front end of the vehicle 102 when travelling in the second direction. These example characteristics may facilitate greater maneuverability, for example, in small spaces or crowded environments, such as parking lots and urban areas.

The illustrative example includes a magnified, partial cut-away portion 120 of a region proximate the first end 114 of the vehicle 102. Assuming the vehicle 102 is travelling in the first direction, e.g., the direction of the arrow 116, the portion 120 illustrates a partial-cross-section in which the front, left wheel 110 and a portion of the body 108 are removed for clarity. As illustrated in the portion 120, the vehicle 102 includes a front surface 122, e.g., a front facia. At least a portion of the front surface 122 defines the first end 114 of the vehicle 102. The vehicle 102 can also include one or more frame elements, of which a lower frame element 124a and a side frame element 124b are specifically represented (herein, the lower frame element 124a and the side frame element 124b may be referred to, collectively, as the "frame elements 124"). For example, the lower frame element 124a may be a first frame element that defines at least a portion of a bottom of the vehicle 102 and the side frame element 124b may be a second frame element that defines at least a portion of a side of the vehicle 102. For instance, the illustrated side frame element 124b may be arranged proximate a right side of the vehicle 102. The vehicle 120 may also include a substantially similar second side frame element 124b, e.g., a third frame element, removed for clarity in FIG. 1.

The frame elements 124 may provide one or more locations to which other components of the vehicle 102 are mounted. For instance, and without limitation, an end of the impact screen 104 may be connected to the side frame element 124b. As illustrated in the example, the front surface 122 may be coupled to the lower frame element 124a. FIG. 1 also illustrates a battery 126 and a motor unit 128 secured to the lower frame element 124a. Moreover, other portions of the body 108 and/or other components may also or alternatively be secured to the frame elements 124. This disclosure is not limited to the illustrated arrangements or attachments. In examples, the frame elements 124 may comprise a chassis. Moreover, the frame elements 124 may include elements in addition to or alternatively than the lower frame element 124a and/or the side frame element 124b.

Figure 2:
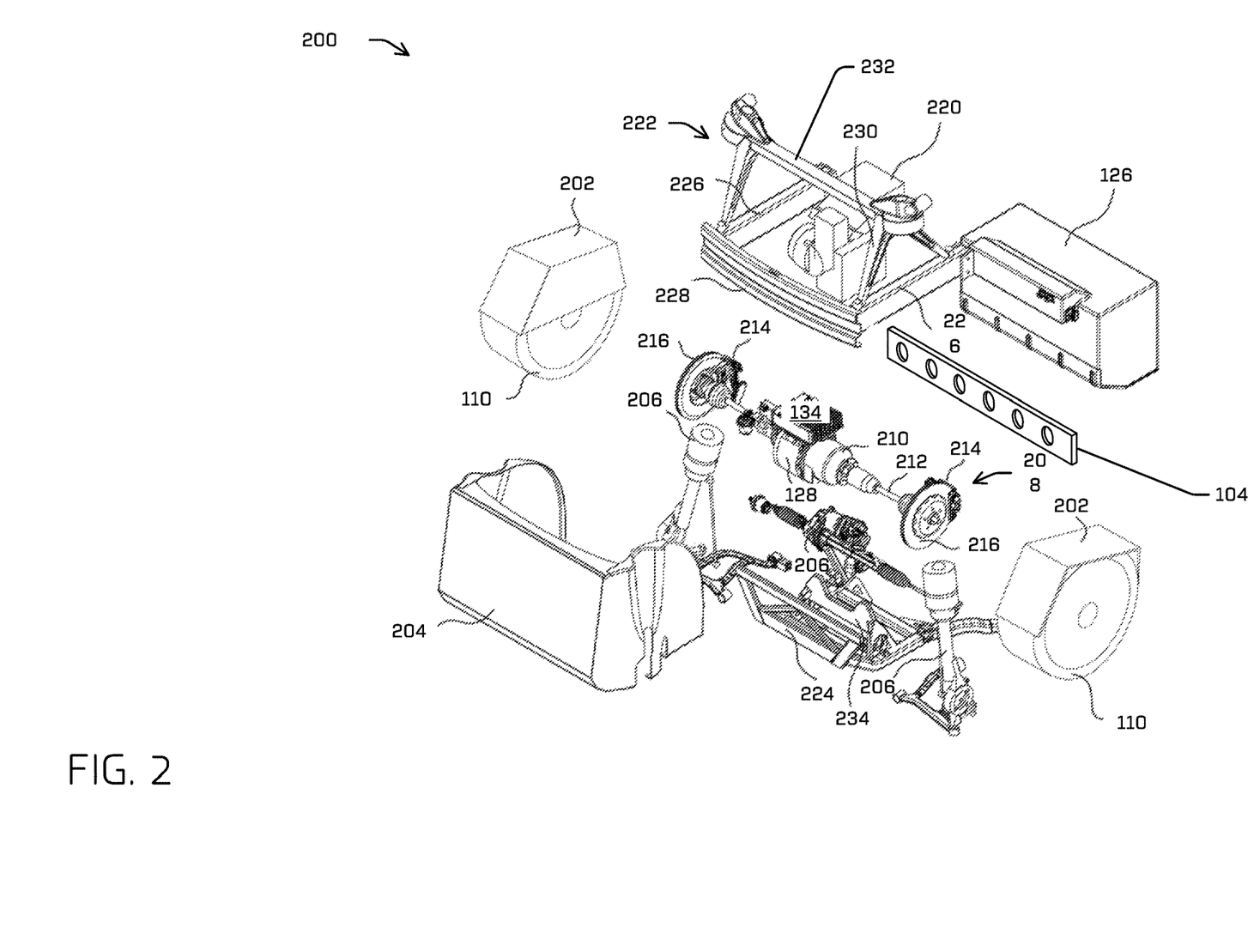
FIG. 2 is an exploded perspective view of another example vehicle including an impact screen, according to aspects of this disclosure.

As illustrated in FIG. 1, the frame elements 124, the body 108, and/or the front surface 122 can generally define the cavity 106. Additional or different structures may also at least partially define the cavity 106. For instance, an interior wall 130, spaced longitudinally from the front surface 122, can define a portion, e.g., a rear portion, of the cavity 106. The cavity 106 may generally comprise a space proximate the front end 114 of the vehicle in which components of the vehicle 102 are disposed. For example, these components can include one or more of propulsion system components, power system components, steering system components, braking system components, suspension system components, drive system components, heating, ventilation and air conditioning (HVAC) system components, electrical system components, computing system components, and/or other systems/system components. FIG. 2, discussed below, illustrates additional of these components in more detail.

FIG. 1 specifically illustrates the cavity as including a battery 126 and the motor unit 128. The motor unit 128 can include an inverter 134 in some examples. The cavity 106 may house or otherwise enclose the battery 126 and the motor unit 128 (including the inverter 134), e.g., by portions of the body 108, the support elements 124, and/or the interior wall 130, to protect these components from the environment 100 and/or to separate the components from other portions of the vehicle 102. For instance, a side of the interior wall 130 opposite the cavity 106 may at least in part define a cargo compartment 132, which can be configured for passengers, cargo, or the like.

As illustrated in FIG. 1, the battery 126 may be arranged in the cavity 106 proximate the interior wall 130. In some examples, the battery 126 may be a high voltage battery generally configured to power aspects of the vehicle 102, including the motor unit 128, e.g., to drive the vehicle 102. As also illustrated, the motor unit 126 and the inverter 134 may be relatively closer to the front surface 122, e.g., along a longitudinal direction of the vehicle. As noted, the motor unit 128 may be configured to rotate an axle to drive the wheels 110. The inverter 134 may be fixed to the motor unit 128, e.g., proximate the top of the motor unit 128. In the illustrated arrangement, the cavity 106 includes a first space 136 longitudinally between the front surface 120 and the motor unit 126/inverter 134 and a second space 138 between the motor unit 126/inverter 134 and the battery 126. Other (non-illustrated) components also may be disposed in or proximate the first space 136 and/or the second space 138, however such components may be less likely to cause damage and/or loss during a vehicle collision.

During a collision event proximate the front surface 120 of the vehicle 102, e.g., a head-on collision when the vehicle 102 is travelling in the first direction identified by the arrow 116, the front surface 120 and the motor unit 128/inverter 134 may move relatively closer to each other in the longitudinal direction, e.g., reducing a longitudinal extent of the first space 138. In addition, the battery 126 and the motor unit 128/inverter 134 may move relatively closer to each other in the longitudinal direction, e.g., reducing a longitudinal extent of the second space. The motor unit 128 (with or without the inverter 134) and the battery 126 may be among the most massive of components in the cavity 106 and thus may be sources of increased damage in collisions involving the vehicle 102. For instance, in some conventional arrangements, an impact as just described may result in the motor unit 128 impacting the battery 126. Depending on the force of the impact, in some instances the battery may become damaged. Such damage can result in expensive repair, unwanted current leak from the battery, e.g., to other components of the vehicle, and, in some examples, the battery may explode. In addition to becoming damaged, in some examples the battery 126 may cause the middle wall 130 to deform or fail, thereby effecting the cargo compartment 132. As will be appreciated, impacts to the cargo compartment 132 may be particularly dangerous to passengers in the vehicle 102. As will also be appreciated, although this specification describes an example of the motor unit 128 and the battery 126, the impact screen 104 may be used to deter movement of any component(s) associated with the vehicle 102.

The impact screen 104 may reduce the impacts of collisions, including those impacts just described. As illustrated, the impact screen 104 is disposed in the second space 138 and, more particularly, is configured to extend generally longitudinally through the second space 138. In examples, the impact screen 104 may have a length (into the page in FIG. 1) terminating at opposite ends and may be fixed proximate those ends to the illustrated side frame element 124b and a second side frame element (removed for clarity in the magnified portion 120 of FIG. 1). As shown, and as detailed further herein, the impact screen 104 also may have a thickness, e.g., in the horizontal dimension parallel to the arrow 116 in FIG. 1, and a height, e.g., in a vertical dimension normal to the thickness. In implementations of the impact screen 104, the thickness may be substantially smaller than the height (and length), e.g., to minimize the extent of the impact screen 104 in the second space 138, and, particularly, in the longitudinal dimension in the second space 138.

As noted above, during a collision event in which some force is applied proximate the front surface 122, e.g., a head-on collision, the motor unit 128, which may include the inverter 134, may move relatively closer to the battery 126. However, the impact screen 104 is disposed in a path of travel of the motor unit 128 to slow the momentum of the motor unit 128 and/or re-direct the motor unit 128 away from the battery 126. For instance, while the first space 136 and the second space 138 collapse in the longitudinal direction as a result of the collision, the motor unit 128 may contact the impact screen 104, and the impact screen 104 may act as a deterrent to continued travel toward the battery 126. Moreover, because of the relatively thin profile of the impact screen 104, the impact screen 104 is unlikely to exacerbate damage, e.g., by further reducing the width of the second space 138. Stated differently, while the impact screen 104 could be relatively thicker, e.g., as a bumper, such bumper may have the unintended consequence of, after an initial deformation, forming a rigid body with the motor unit 128 that acts to transfer force from the motor unit 128 more quickly than in the absence of the bumper. FIG. 4, discussed in more detail below, shows additional details of the functioning of the impact screen 104 during a head-on impact.

Although the magnified portion 120 is illustrative of the first end 114 of the vehicle 102, in some implementations, the second end 114 of the vehicle 102 may be substantially identical. For instance, aspects of the vehicle 102 associated with the magnified portion 120 can comprise a drive module that is selectively secured to a passenger module, e.g., at or proximate the middle surface 130, and the vehicle 102 can include a second drive module at the second end 118. Examples of vehicles with interchangeable drive modules are described in U.S. patent application Ser. No. 15/674,688, filed Aug. 11, 2017, and entitled "Vehicle with Interchangeable Drive Modules," the disclosure of which is hereby incorporated by reference in its entirety. For instance, the impact screen 104 can be integrated into a drive module, e.g., which may comprise a portion of a vehicle.

FIG. 2 is an exploded view of a portion 200 of a vehicle, such as the vehicle 102. For instance, the portion 200 may be associated with the first end 114 and/or the second end 118 of the vehicle 102. Without limitation, an instance of the portion 200 may be located at the first end 114 of the vehicle 100 and a second instance of the portion 200 may be located at the second end 114 of the vehicle. In some instances, the portion 200 may comprise a module, such as a drive module, selectively attachable to a body to form a vehicle. The portion 200 may illustrate, at least in part, components similar to those shown in the magnified portion 120 in FIG. 1 in more detail, as well as additional components. Components introduced in the description of FIG. 1 are given the same reference numerals in FIG. 2, unless otherwise noted. As with FIG. 1, FIG. 2 is for example, and the portion 200 can include more, fewer, and/or different components than those illustrated.

In more detail, the portion 200 includes two of the wheels 110 and one or more body panels, which include fenders 202 associated with the wheels 110 and an end fascia 204. The end fascia 204 may correspond to the front surface 122 discussed above. Moreover, the end fascia 204 and/or the body panels may generally comprise portions of the body 108 of the vehicle 102. The portion 200 can also include one or more suspension systems 206, which may include shocks, struts, active suspension components, control arms, or the like. In the example of FIG. 2, one of the suspension systems 206 may be associated with each of the wheels 110, although in other implementations, the portion 200 may include a single suspension system, e.g., associated with more than one (both) of the wheels 110.

As also illustrated in FIG. 2, the portion 200 can include a propulsion system 208 for driving the wheels 110. For instance, the propulsion system 208 can include the motor unit 128, a gear box 210, and one or more axles 212 communicating with the wheels 110. The motor unit 128 may include the inverter 134, as discussed above. A braking system can include disks 214 and associated calipers 216 in communication with the propulsion system 208. A steering system, including a steering rack 218, and an HVAC system 220 also are illustrated in FIG. 2. The illustrated systems and components are for example only. In additional implementations, the portion 200 may include computing systems, electrical systems, sensor systems, cooling systems, and/or other systems for controlling aspects of a vehicle including the portion 200. Moreover, and as will be evident to those having ordinary skill in the art, the portion 200 may also include harnesses, controls reservoirs, hydraulic lines, valves, pumps, and/or other components not illustrated.

Like the support elements 124 of the vehicle 102 illustrated in FIG. 1, the portion 200 can also include one or more support structures. For example, FIG. 2 is illustrated as including an upper sub-frame 222 and a lower sub-frame 224. The upper sub-frame 222 can include laterally-spaced, longitudinally extending rails 226, each of which may be, in some examples, the side frame element 124b. The upper sub-frame 222 can also include one or more additional framing elements e.g., attached to and/or extending between the rails 226. More specifically, FIG. 2 illustrates a front transverse element 228, angled side elements 230, and a top transverse element 232. The lower sub-frame 224 can incorporate or have fixed thereto a motor mount 234. The motor mount 234 may be configured to secure the motor 128 thereto, e.g., relative to the lower sub-frame 224. In some examples, the lower sub-frame 224 can include the lower frame element 124a. Although the motor mount 234 is specifically illustrated for attachment of the motor 128, the upper sub-frame 222 and the lower sub-frame 224 can include any number of attachment features for securing objects thereto. By way of non-limiting example, the rails 226 of the upper sub-frame 222 can include attachment features for securing opposite ends of the impact screen 104 and/or for securing components of the HVAC system 220 and the lower sub-frame 224 can include features for securing components of the steering system, suspension system, and/or the battery 126. At least one of the upper sub-frame 222 and/or the lower sub-frame 224 can also be configured for attachment to additional sections of the vehicle, e.g., to one or more frame elements associated with a passenger or cargo section.

In the illustrated arrangement, the lower sub-frame 224 may be arranged proximate a bottom of the vehicle portion 200 and between the longitudinally extending rails 226 of the upper sub-frame 222. Accordingly, at least a portion of the lower sub-frame 224 and a portion of the upper sub-frame 222 can define the cavity 106, discussed above, when the portion 200 is assembled. The end fascia 204, side panels, and/or other components also may determine bounds of the cavity 106. As also illustrated, at least portions of the propulsion system 208 (including the motor unit 128, which may include the inverter 134), the battery 126, and the impact screen 104 are disposed in the cavity when the portion 200 is assembled.

In some implementations, the upper sub-frame 222 and the lower sub-frame 224 can be fixed to each other. In examples, however, the lower sub-frame 224 may be movable relative to the upper sub-frame 222. For instance, examples of this disclosure relate to vehicle collisions, and in some such collisions, e.g., collisions at the end facia 202, the lower sub-frame 224 may move longitudinally relative to the upper sub-frame 222. For example, the lower sub-frame 224 may be secured other than to the upper sub-frame 222 such that a force at the lower sub-frame 224 may have reduced or minimal impact at the upper sub-frame 222. In other examples, a connection between the upper sub-frame 222 and the lower sub-frame 224 may be sufficiently weak that sufficient impact, e.g., along the longitudinal direction, at the end fascia 204 or at the lower sub-frame 224, will break the connection, e.g. through shear forces, to allow the lower sub-frame 224 to move relative to the upper sub-frame 222. In some instances, the lower sub-frame 224 may move relative to the rails 226. Also in examples, this relative movement may be facilitated by one or more frame designs. By way of non-limiting example, U.S. patent application Ser. No. 16/399,490, filed Apr. 30, 2019, and entitled "Impact Structure," describes a design for a beam that includes multiple portions that react differently in an impact. In non-limiting examples, such teaching can be incorporated into the rails 226. The '490 application is hereby incorporated by reference in its entirety. Regardless of the component(s) causing the relative movement, the result of such movement may promote functioning of the impact screen 104, as described further herein, including with reference to FIG. 4 below.

Figure 3A:
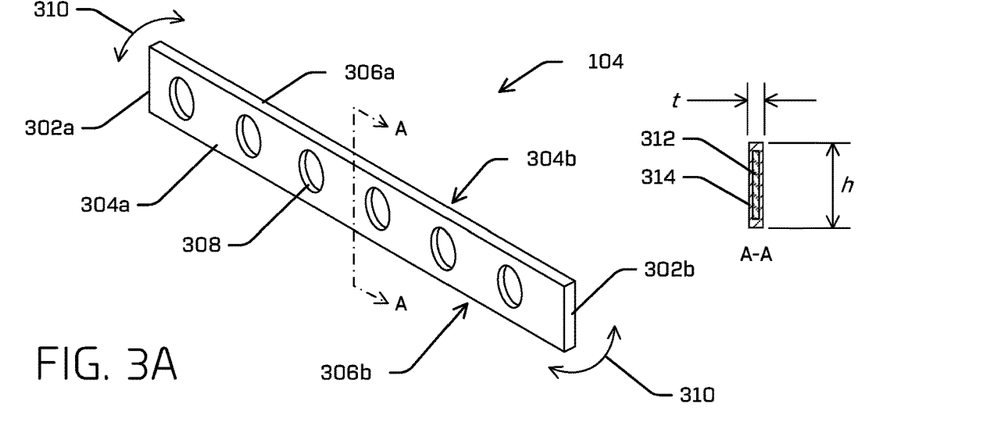
FIGS. 3A-3D are views of example impact structures according to aspects of this disclosure.

FIG. 3A illustrates the impact screen 104 in more detail. Specifically, FIG. 3A illustrates that the impact screen 104 may be a generally elongate member having a length terminating at opposite ends 302a, 302b. As also illustrated, the impact screen 104 includes a first face 304a and a second face 304b opposite the first face 304a. The first face 304a and the second face 304b are separated by a thickness t of the impact screen 104. The impact screen 104 also includes a top edge 306a and a bottom edge 306b separated from the top edge 306a by a height h of the impact screen 104.

The length of the impact screen 104 may be sufficient to span a width of the vehicle (or cavity) in which the impact screen 104 is disposed. For instance, returning to the example of FIG. 2, the impact screen may have a sufficient length such that one of the ends 302a, 302b is secured to a first of the rails 226 and the other of the ends 302a, 302b is secured to a second of the rails 226. Although the ends 302a, 302b are illustrated as generally parallel, flat surfaces, the first and second faces 304a, 304b are illustrated as generally parallel, flat surfaces, and the top edge 306a and bottom edge 306b are illustrated as generally parallel, flat surface, such is not required. For instance, one or more of these surfaces may be contoured, tapered, or otherwise differently shaped. In at least some examples, one or both of the ends 302a, 302b can include one or more attachment features, e.g., for securing the impact screen 104 in the vehicle. By way of non-limiting example, the impact screen 104 may also include mounting holes, slots, hooks, or other features proximate the ends 302a, 302b to facilitate securement of the impact screen 104 proximate the ends 302a, 302b. Without limitation, such securement features may be configured to cooperate with mounting features on portions of the vehicle and/or with known fasteners.

As also illustrated in FIG. 3A a number of apertures 308 are formed through the impact screen 104. In more detail, the apertures 308 are openings or holes extending through the thickness t of the screen, from the first face 304a to the second face 304b. In some examples, the apertures 308 may reduce the weight of the impact screen 104 and/or may promote airflow through the impact screen 104, e.g., relative to an impact screen without openings. Although FIG. 3A includes six equally-sized and equally-spaced apertures 308 of the same shape, this disclosure is not limited to the examples illustrated. For example, FIGS. 3B and 3C, described below, illustrate additional example apertures. In some implementations, apertures 308 may not be included. As will be appreciated, when included, the apertures 308 may be sized, shaped and positioned to maintain the structural integrity of the impact screen 104, e.g., to perform functions described herein.

As described herein, the impact screen 104 may be fixed proximate the ends 302a, 302b, e.g., to frame elements or other components spaced in a lateral direction, and may be otherwise substantially unrestrained along the length. Thus, the impact screen 104 may be held in tension laterally across the cavity 104. During a collision event, the motor unit 128 may contact the impact screen 104, e.g., on the first face 306 between the ends 302a, 302b, and the impact screen 104 acts to catch or restrain movement of the motor unit 128. In implementations of this disclosure, the length of the impact screen 104 is significantly longer than the thickness t of the impact screen 104 As a result of the shape, the impact screen may be at least partially flexible. For instance, the impact screen 104 may flex generally in the directions illustrated by the arrows 310 when contacted by the motor unit 128. However, in example implementations, the impact screen 104 may be constructed to be substantially rigid, and to absorb a majority of the energy associated with the moving motor unit 128, e.g., by converting the motor unit's kinetic energy to potential energy.

In some examples, the thickness t may be on the order of about 20 millimeters or thinner, whereas the length may be up to one meter or longer. These are for example only, and not limitation. The thickness t may generally be chosen to minimize reduction of the space in which the impact screen 104 is placed and, in particular, to reduce the longitudinal extent of the impact screen 104. Specifically, when the motor unit 128 is forced toward the battery 126 during a collision event, a likelihood of the motor unit 128 coming in to (forceful) contact with the battery 126 can be reduced by increasing the longitudinal distance between the motor unit 128 and the battery 126. In the example of FIG. 1, this distance is generally the longitudinal extent of the second space 138. Placing objects in the second space, including the impact screen 104, will effectively reduce that longitudinal extent. To illustrate, consider an example in which the thickness t of the impact screen 104 is substantially equal to the height h. During a collision event as described above, the impact of the motor unit 128 on the impact screen may merely drive the impact screen into the battery 126, causing the type of impact the impact screen 104 aims to reduce or eliminate. In practice, the thickness t may be chosen to be as thin as possible without sacrificing functionality described herein.

FIG. 3A also includes a cross-section of the impact screen 104, along the section line A-A. As shown, the impact screen 104 may include a core 312 and a coating 314, for instance. In some examples, the core 312 may be at least partially metallic, e.g., stainless steel, iron, alloys, or any other metal or metal-including material. The core 312 may be sheet metal cut or otherwise formed to the desired length and height, with the apertures 308 stamped, cut, or otherwise formed therethrough. Of course, this is for example only as other metal structures and/or manufacturing techniques may be used. Moreover, while metal may be preferred because of its relatively desirable strength in tension, the impact screen 104 and/or the core 312 are not required to include metal.

The coating 314 may be a polymeric coating, a powder coating, or other type of coating. In examples, the coating 314 may protect the underlying core 312, e.g., from debris, moisture, or the like, which could cause corrosion. The coating 314 may also reduce noise emissions. For instance, a metallic structure may cause unwanted noise, e.g., due to vibration, movement, or the like, during operation of the vehicle, and a polymeric or other coating may reduce this noise. In some instances, the coating 314 may also provide an aesthetic function. Although the impact screen 104 is illustrated as a two-material structure, in other implementations, the impact screen 104 may be formed of a single, e.g., uniform, material. For instance, the coating 314 may not be included. In still further examples, the impact screen 104 may include more than two materials.

Figure 3B:
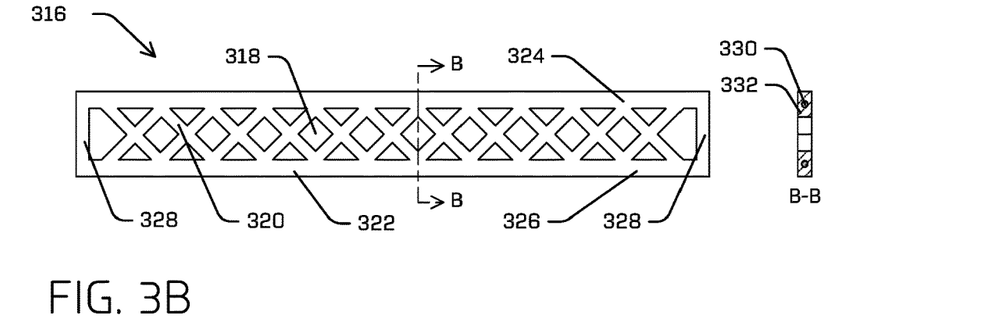

FIG. 3B illustrates another example of an impact screen 316. The impact screen 316 may have ends, faces, and edges generally the same as those shown in FIG. 3A and discussed with reference to that figure. Accordingly, those features are not called out in FIG. 3B and will not be discussed further here. As illustrated in the plan view of FIG. 3B, the impact screen 316 includes a plurality of apertures 318 different from the circular apertures 308 of the impact fence 120. Specifically, the apertures 318 are diamond and triangular in shape, formed as spaces between diagonally-arranged legs 320 extending between a peripheral frame 322. In the illustration, the peripheral frame 322 can include a top 324 spaced from a bottom 326, with each of the top 324 and the bottom 326 extending between opposite ends 328. The top 324 and the bottom 326 are horizontal and the ends 328 are vertical in the example, e.g., such that the frame 322 is substantially rectangular, although other shapes can be used. As with the impact screen 104, the impact screen 316 can be affixed at the ends 328 to a frame element or other vehicle component. In other examples, the ends 328 may not extend between the top 324 and the bottom 326. For example, the legs 320 can extend between the top 324 and bottom 326 as shown, with the impact screen 316 being affixed at distal ends of the top 324 and the bottom 326.

FIG. 3B also includes a cross-sectional view of the impact screen 316, taken along the section line B-B. As shown, the impact screen 316 can include a core 330 and a coating 332 disposed to encapsulate the core 330, similar to the example shown in FIG. 3A. The core 330 and the coating 332 may include the materials and properties discussed above. As illustrated, the core 330 may be circular in cross-section. In some examples, the core 330 may comprise a metallic wire, rope, cable, or similar structure. For instance, the core 330 may be a braided metal rope made up of a plurality of wire strands, as is conventionally known. In the context of the impact screen 316, one or more sections of wire rope may be used to form the peripheral frame 322 and one or more different sections of wire rope may form the legs 320. For instance, two sections of wire rope can be laced, braided, or otherwise intertwined within the space defined by the peripheral frame. Once arranged to form the shape of the impact screen 316, the coating 332 may then be applied to the wire rope(s). In other examples, pre-coated wire ropes may be used to form the structure. The impact screen 316 may be formed other than using wire ropes or cables.

Figure 3C:
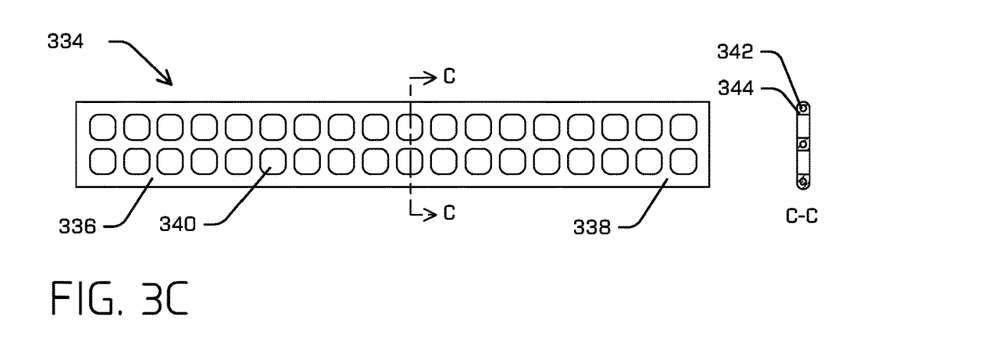

FIG. 3C shows yet another example impact screen 334 in which legs 336 are aligned vertically and horizontally within a peripheral frame 338 to define substantially square apertures 340. FIG. 3C also includes a cross-section of the impact screen 334, which illustrates that the screen 334 can include a core 342 and a coating 334, similar to embodiments discussed above. In examples, the legs 336 and/or the peripheral frame 338 can be formed from metal wire, rope, cable, or the like, as in the example of FIG. 3B.

Figure 3D:
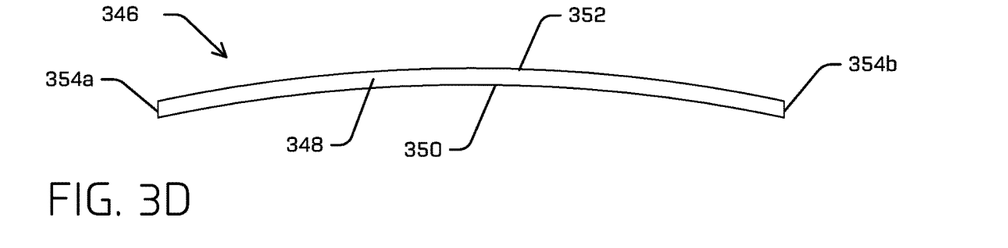

FIG. 3D illustrates another impact screen 346, according to an additional example. Specifically, the impact screen 346 is shown from a top, plan view, and includes a top edge 348 extending between a first face 350 and a second face 352 in a first (e.g., vertical in the figure) direction. The impact screen 346 extends to lateral ends 354a, 354b. Unlike examples described above, however, the faces 350, 352 are curved or arcuate. As noted above, because of the relatively minimal thickness of example impact screens, e.g., the small distance between the first face 350 and the second face 352, the screen may have some flexibility. The screen 346 may be pre-flexed in the illustrated arcuate position. According to this example, loads in the screen 346, e.g., caused by contact of the motor unit 128 can be distributed differently through the arcuate structure. In examples, the front face 350 or the second face 352 can be arranged to face the motor unit 128, e.g., depending on the desired displacement of the impact screen 346 under the force of the motor unit 128. The arc is for example only; the impact screen 346 can include more or less flexure. Although the impact screen 346 is only shown on edge, the impact screen 346 can otherwise include structures such as those described further herein.

As noted herein, the impact screens 104, 316, 334, 346 are examples. Other examples are contemplated and will be appreciated by those having ordinary skill in the art, with the benefit of this disclosure. Other impact screens can be formed as nets, webs, lattices, trellises, or other arrangements that may provide the functionality described herein.

Figure 4A:
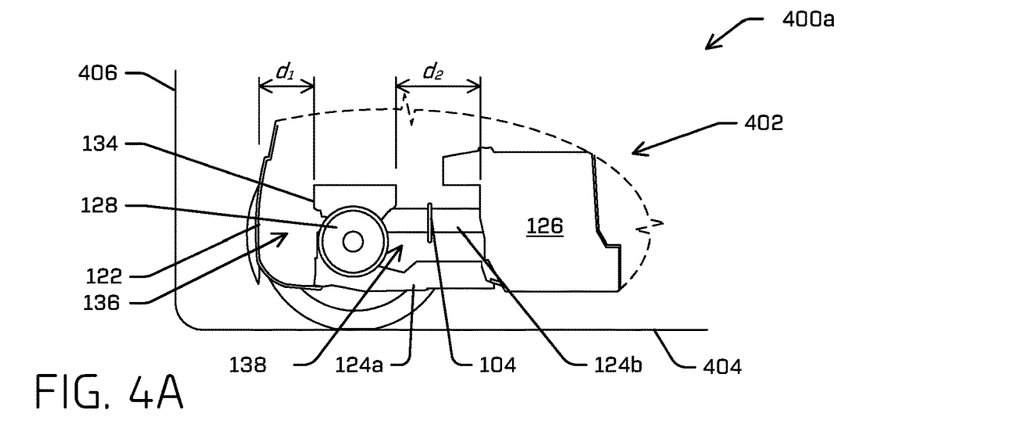
FIGS. 4A-4C are side views demonstrative of states of an example vehicle with an impact screen during a collision event, according to aspects of this disclosure.
Figure 4B:
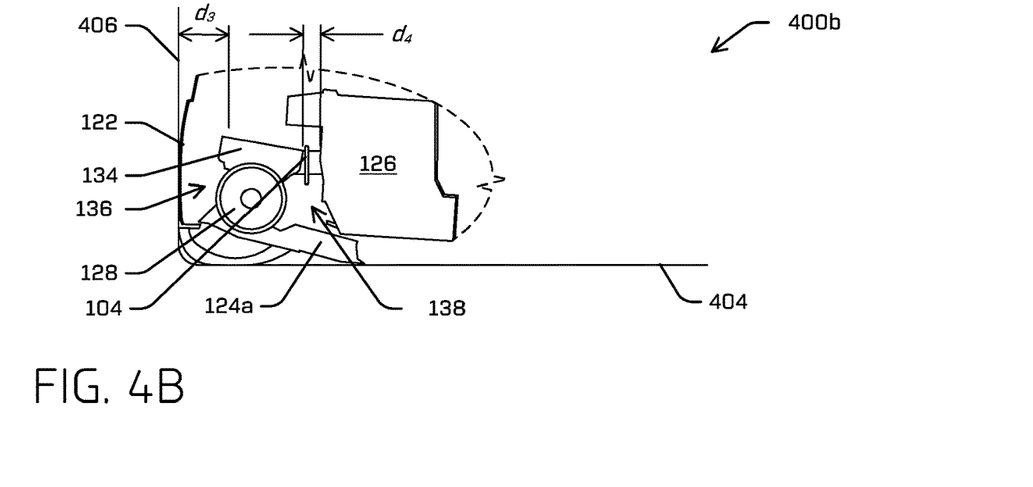
Figure 4C:
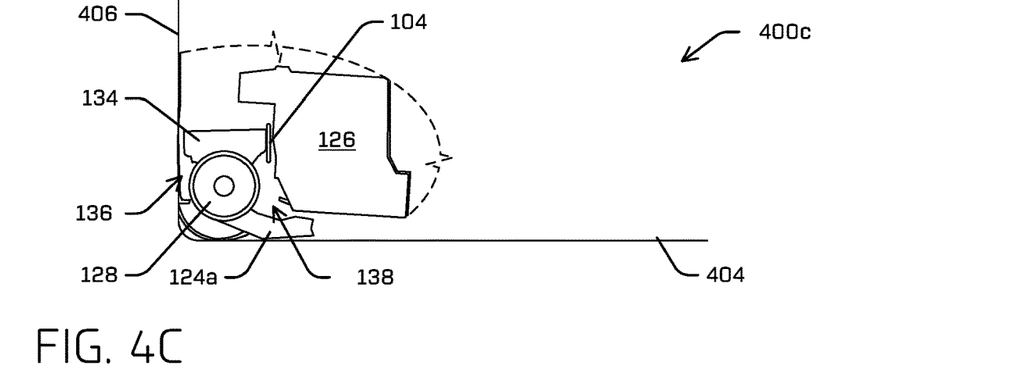

FIGS. 4A-4C illustrate aspects of the functionality of the impact screens 104, 316, 334, 346. Specifically, FIG. 4A shows a first state 400a of a section of a vehicle 402 of a vehicle. The section 402 may be substantially the same as the section shown in the portion 120 of FIG. 1. Specifically, in the first state 400a, the vehicle 402 is operating under normal conditions, e.g., travelling along a surface 404, and approaching an obstruction 406. As illustrated in the first state, the vehicle 402 includes the front surface 122, the motor unit 128, which can include the inverter 134, spaced longitudinally from the front surface 122, and the battery 126 spaced longitudinally from the motor unit 128. These components generally define the first space 136 and the second space 138. As also illustrated, the motor unit 128 may be affixed to the lower frame element 124a (which may be the lower sub-frame 224, including the motor mount 234). In addition, the impact screen 104 is disposed in the second space 138. The impact screen 104 may be fixed at opposite ends to side rails, e.g., associated with the side frame element 124b (which may be the upper sub-frame 222, including the rails 226). As further illustrated, the first space 136 may be defined by a first longitudinal distance $d_1$ and the second space 138 may be defined by a second longitudinal distance $d_2$.

FIG. 4B illustrates a second state 400b of the vehicle 402 as the vehicle 402 collides with the obstruction 406. As a result of the impact of the collision, portions of the vehicle 402 have begun to move. Notably, the first longitudinal distance di has reduced to a third longitudinal distance $d_3$ and the second longitudinal distance $d_2$ has shortened to a fourth longitudinal distance $d_4$. Specifically, the front surface 122 has begun to crush, e.g., toward the motor unit. Also, and as shown in the illustration, the lower frame element 124a is detached from the battery 126 and has advanced to a position under the battery 126. As a result, the motor unit 128 has also moved relatively closer to the battery 126. In examples, the lower frame element 124a may move relative to the side frame element 124b, and thus the motor unit 128 is relatively closer to, and may contact, the impact screen 104. In some examples, and although not shown in FIG. 4B, the side frame unit 124b may also deform in the longitudinal direction, e.g., by buckling or the like, such that the impact screen may also move closer to battery 126.

FIG. 4C illustrates a third state 400c of the vehicle 402, also illustrating aspects of the collision. For example, the third state 400c may be later in time than the second state and/or may result from a higher impact, e.g., when the vehicle is travelling at a higher speed. As a result of this higher force impact, both the first space 136 and the second space 138 are all but eliminated. The impact screen 104 has retained the motor unit 128 (including the inverter 134) at a position away from the battery 126, e.g., to prevent damage of the battery 126 by the motor unit 128. In some instances, the motor unit 128 and/or the impact screen 104 may contact the battery 126 as a result of the collision, but the impact screen 104 may reduce the force of the impact between these components.

The states 400a, 400b, 400c illustrated in FIGS. 4A, 4B, and 4C are intended to illustrate example states, and other states may be used to illustrate components of the vehicle. For instance, the states may vary based on a force at which the vehicle impacts and obstruction, a type of obstruction, the location of the impact on the vehicle 102, or the like. Moreover, although examples describe using the impact screen 104 to prevent or limit impacts between the motor unit 128 and the battery 126, in other examples the impact screen 104 can be used to limit or prevent impacts between other or additional components. For instance, the impact screen 104 can be placed longitudinally between any two components for which limiting an impact during a collision event is desired.

Conclusion

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A: An example vehicle includes: a motor unit disposed in a cavity proximate an end of the vehicle, the motor unit spaced from a first end of the vehicle in a longitudinal direction, a first space being defined between the first end and the motor; a battery disposed in the cavity and spaced from the motor unit in the longitudinal direction, a second space being defined between the motor unit and the battery; and a screen extending laterally through at least a portion of the second space, wherein, in a vehicle impact proximate the first end of the vehicle resulting in at least a partial collapse of the second space, at least a portion of the motor unit contacts the screen to reduce a momentum of the motor unit toward the battery.

B: The vehicle of example A, further comprising: a first frame element at least partially spaced from the first side of the body and from second side of the body; a second frame element proximate the first side of the body; and a third frame element proximate the second side of the body, wherein the motor unit is secured to the first frame element, the first screen end is secured to the second frame element, and the second screen end is secured to the third frame element, and wherein the first frame element, the second frame element, and the third frame element are configured such that, in the vehicle impact, the motor unit moves relative to the screen.

C: The vehicle of example A or example B, wherein the screen comprises a polymer-coated metal structure.

D: The vehicle of any one of example A through example C, wherein the metal structure comprises at least one of sheet metal having a first plurality of apertures extending from a first face to a second face or one or more wire ropes configured to extend from the first end of the screen to the second end of the screen and defining a second plurality of apertures.

E: The vehicle of any one of example A through example C, wherein the motor unit comprises an inverter and at least a portion of the inverter contacts the screen in the vehicle impact.

F: An example portion of a vehicle includes: a motor unit disposed in a cavity; a battery disposed in the cavity and spaced from the motor unit in a longitudinal direction; and a screen extending laterally through a space between the motor unit and the battery, the screen being spaced in the longitudinal direction from the battery.

G: The portion of the vehicle of example F, wherein: the screen comprises a first screen end and a second screen end spaced from the firstscreen end; and the first screen end is fixed proximate a first side of the portion of the vehicle and the second screen end is fixed proximate a second side of the portion of the vehicle, opposite the first side.

H: The portion of the vehicle of example F or example G, further comprising: a first frame element proximate the first side; a second frame element proximate the second side; and a third frame element at least partially spaced from the first side and from the second side; wherein the first screen end is fixed to the first frame element, the second screen end is fixed to the second frame element, and the motor unit is fixed to the third frame element.

I: The portion of the vehicle of any one of example F through example H, wherein, during a vehicle impact proximate the end: at least a portion of the motor unit contacts the screen; and the screen reduces a momentum of the motor unit in a direction toward the battery.

J: The portion of the vehicle of any one of example F through example I, wherein the first frame element comprises a first rail extending generally in the longitudinal direction proximate the first side of the vehicle and the second frame element comprises a second rail extending generally in the longitudinal direction proximate the second side of the vehicle.

K: The portion of any one of example F through example J, wherein: the screen is defined by a length extending between the first end and the second and a thickness substantially normal to the length and extending between a first face and a second face, and the screen is positioned such that the first face faces the motor unit and the second face faces the battery.

L: The portion of any one of example F through example K, wherein the screen comprises one or more apertures extending through the screen from the first face to the second face.

M: The portion of any one of example F through example L, wherein the screen is further defined by a height normal to the length and normal to the thickness, the screen being at least one of at least partially arcuate along the length or at least partially arcuate along the height.

N: The portion of any one of example F through example M, wherein the screen comprises a metal structure comprising at least one of sheet metal or wire rope.

O: The portion of any one of example F through example N, wherein the screen further comprises a polymer material coating the metal structure.

P: An example vehicle portion includes: a motor unit disposed in a cavity proximate an end of the vehicle; a battery disposed in the cavity and spaced from the motor unit in a longitudinal direction; a first frame element proximate a first side of the cavity; a second frame element proximate a second side of the cavity; and a screen comprising a first screen end fixed relative to the first frame element and a second screen end fixed relative to the second frame element, the screen extending between the first frame element and the second frame element and through a space longitudinally between the motor unit and the battery.

Q: The vehicle portion of example P, wherein, during a vehicle impact proximate the end of the vehicle: the motor unit moves in the longitudinal direction relative to the first frame element and relative to the second frame element; at least a portion of the motor unit contacts the screen; and the screen reduces a momentum of the motor unit in a direction toward the battery.

R: The vehicle portion of example P or example Q, wherein: the screen is defined by a length extending between the first end and the second and a thickness substantially normal to the length and extending between a first face and a second face, and the screen is positioned such that the first face faces the motor unit and the second face faces the battery.

S: The vehicle portion of any one of example P through example R, wherein the screen comprises one or more apertures extending through the thickness of the screen from the first face to the second face.

T: The vehicle portion of any one of example P through example S, wherein the screen comprises a polymer-coated metal structure, the metal structure comprising at least one of sheet metal or one or more wire ropes.

What is claimed is:
1. A vehicle comprising:
a support frame comprising a first frame element proximate a first side of the vehicle, a second frame element proximate a second side of the vehicle, opposite the first side, and a third frame element at least partially spaced from the first side and from the second side;
a motor unit disposed in a cavity proximate an end of the vehicle and fixed to the third frame element, the motor unit spaced from a first end of the vehicle in a longitudinal direction, a first space being defined between the first end and the motor unit;
a battery disposed in the cavity and spaced from the motor unit in the longitudinal direction, a second space being defined between the motor unit and the battery; and
a screen extending laterally through at least a portion of the second space, the screen extending between a first screen end fixed to the first frame element and a second screen end fixed to the second frame element,
wherein, in a vehicle impact proximate the first end of the vehicle at least a portion of the motor unit moves in the longitudinal direction toward the battery, resulting in at least a partial collapse of the second space, and wherein at least a portion of the motor unit contacts the screen, the screen at least partially bending relative to the longitudinal direction to reduce a momentum of the motor unit toward the battery in the longitudinal direction.

2. The vehicle of claim 1, wherein:
the third first frame element is at least partially spaced from a first side of a body of the vehicle and from a second side of a body of the vehicle.

3. The vehicle of claim 1, wherein the screen comprises a polymer-coated metal structure.

4. The vehicle of claim 3, wherein the metal structure comprises at least one of sheet metal having a first plurality of apertures extending from a first face to a second face or one or more wire ropes configured to extend from the first screen end to the second screen end and defining a second plurality of apertures.

5. The vehicle of claim 1, wherein the motor unit comprises an inverter and at least a portion of the inverter contacts the screen in the vehicle impact.

6. A portion of a vehicle comprising:
a support frame comprising a first frame element proximate a first side of the portion of the vehicle, a second frame element proximate a second side of the portion of the vehicle, opposite the first side, and a third frame element at least partially spaced from the first side and from the second side;
a motor unit disposed in a cavity and coupled to the third frame element of the support frame;
a battery disposed in the cavity and coupled to the support frame, the battery being spaced from the motor unit in a longitudinal direction; and
a screen extending laterally through a space between the motor unit and the battery, the screen being spaced in the longitudinal direction from the battery, wherein the screen comprises a first screen end and a second screen end spaced from the first screen end, and the first screen end is fixed to the first frame element and the second screen end is fixed to the second frame element,
wherein the support frame is configured to deform, during an impact proximate an end of the vehicle, to cause the motor unit to move relative to the battery in the longitudinal direction and to contact the screen.

7. The portion of the vehicle of claim 6, wherein the third frame element extends between a first end coupled to the motor unit and a second end coupled to the battery, and
wherein the third frame is configured, during the impact proximate the end, to decouple from the battery to facilitate movement of the motor unit in the longitudinal direction toward the battery.

8. The portion of the vehicle of claim 6, wherein the first frame element comprises a first rail extending generally in the longitudinal direction proximate the first side of the vehicle and the second frame element comprises a second rail extending generally in the longitudinal direction proximate the second side of the vehicle.

9. The portion of the vehicle of claim 6, wherein:
the screen is defined by a length extending between the first screen end and the second screen end and a thickness substantially normal to the length and extending between a first face and a second face, and
the screen is positioned such that the first face faces the motor unit and the second face faces the battery.

10. The portion of the vehicle of claim 9, wherein the screen comprises one or more apertures extending through the screen from the first face to the second face.

11. The portion of the vehicle of claim 9, wherein the screen is further defined by a height normal to the length and normal to the thickness, the screen being at least one of at least partially arcuate along the length or at least partially arcuate along the height.

12. The portion of the vehicle of claim 9, wherein the screen comprises a metal structure comprising at least one of sheet metal or wire rope.

13. The portion of the vehicle of claim 12, wherein the screen further comprises a polymer material coating the metal structure.

14. A vehicle portion comprising:
a first frame element proximate a first side of the vehicle portion;
a second frame element proximate a second side of the vehicle portion, opposite the first side;
a third frame element at least partially spaced from the first side and from the second side;
a motor unit disposed in a cavity proximate an end of a vehicle, the motor unit being coupled to the third first frame element;
a battery disposed in the cavity and spaced from the motor unit in a longitudinal direction, the battery being coupled to the third frame element; and
a screen comprising a first screen end fixed relative to the first frame element and a second screen end fixed relative to the second frame element, the screen extending between the first frame element and the second frame element and through a space longitudinally between the motor unit and the battery,
wherein the third frame element is configured, during a vehicle impact proximate the end of the vehicle, to deform and cause the motor unit to move relative to the battery in the longitudinal direction.

15. The vehicle portion of claim 14 wherein, during the vehicle impact proximate the end of the vehicle:
the motor unit moves in the longitudinal direction relative to the first frame element and relative to the second frame element;
at least a portion of the motor unit contacts the screen; and
the screen flexes to reduce a momentum of the motor unit in a direction toward the battery.

16. The vehicle portion of claim 14, wherein:
the screen is defined by a length extending between the first end and the second and a thickness substantially normal to the length and extending between a first face and a second face, and
the screen is positioned such that the first face faces the motor unit and the second face faces the battery.

17. The vehicle portion of claim 16 wherein the screen comprises one or more apertures extending through the thickness of the screen from the first face to the second face.

18. The vehicle portion of claim 14 wherein the screen comprises a polymer-coated metal structure, the metal structure comprising at least one of sheet metal or one or more wire ropes.

* * * * *